United States Patent [19]

Seachman et al.

[11] Patent Number: 5,790,211
[45] Date of Patent: Aug. 4, 1998

[54] PLATEN COVER FOR A DIGITAL DOCUMENT SCANNER WITH ELECTRICALLY SWITCHABLE REFLECTANCE MODES

[75] Inventors: Ned J. Seachman, Penfield; Leon C. Williams, Walworth, both of N.Y.

[73] Assignee: Xerox Corporation, Stamford, Conn.

[21] Appl. No.: 525,884

[22] Filed: Sep. 8, 1995

[51] Int. Cl.$^6$ .................................................. G02F 1/13
[52] U.S. Cl. .................................................. 349/3; 349/113
[58] Field of Search .................................... 335/75; 399/207, 399/377, 379, 380; 349/2, 3, 113, 115

[56] References Cited

U.S. PATENT DOCUMENTS

| | | | |
|---|---|---|---|
| 3,936,172 | 2/1976 | McVeigh | 349/2 |
| 4,012,122 | 3/1977 | McVeigh | 349/3 |
| 4,603,945 | 8/1986 | Fergason | 349/2 |

OTHER PUBLICATIONS

English Abstract of Laid-open Japanese Patent Application, JP05252350.

*Primary Examiner*—William L. Sikes
*Assistant Examiner*—James A. Dudek
*Attorney, Agent, or Firm*—Michael J. Nickerson

[57] ABSTRACT

A system and method digitally scans a document using a high reflectance mode and a low reflectance mode. Initially, a platen cover provides a low reflectance background around the document and the scanner scans the low reflectance background and document to determine an edge of the document or to retrieve other image characteristics of the document. Subsequently, the platen cover changes so as to provide a high reflectance background around the document. The scanner then scans the high reflectance background and the document and produces digital image data relating to an image on the document.

15 Claims, 3 Drawing Sheets

PLATEN COVER FOR A DIGITAL DOCUMENT SCANNER WITH ELECTRICALLY SWITCHABLE REFLECTANCE MODES

FIELD OF THE PRESENT INVENTION

The present invention is directed to a platen cover for a digital document scanner with at least two reflectance modes. More specifically, the present invention is directed to a cover surface for a platen cover which is adjacent to the input document such that the cover surface is rapidly switchable from low diffuse reflectance to high diffuse reflectance in response to the functional requirements of the digital scanner.

BACKGROUND OF THE PRESENT INVENTION

FIG. 6 illustrates a conventional document scanner. In the conventional scanner, a light source 2 is used to illuminate a document 5 having the image thereon. The conventional document scanner also includes a glass platen 4 upon which the document 5 rests and a platen cover 17. FIG. 6 also shows the optical centerline 1 for the conventional document scanner.

The platen cover 17 for a conventional document scanner is constructed of a high diffuse reflectance white surface and is located immediately above the input document 5. This high diffuse reflectance white surface is illuminated by the light source 2 when the document 5 lying on the glass platen 4 is scanned. By constructing the platen cover 17 of the document scanner with a high diffuse reflectance white surface, the background of the white document and the surrounding platen cover surface presents a similar, high reflectance to the optical system and photosensor or photoreceptor below the platen.

The high diffuse reflectance white surface enables the conventional document scanner to reduce or eliminate dark borders around the copy document, black circles where punch holes exist in the input document, and dark borders around multiple images such as multiple receipts on a single scan. Moreover, the high diffuse reflectance white surface enables the conventional document scanner to improve the contrast of the document's image by reflecting light which is transmitted through the input document.

Although a high diffuse reflectance white surface enables a conventional scanner to eliminate unwanted dark areas, this white surface can prevent a conventional digital scanner from realizing its full potential of functionality. More specifically, digital scanners have the ability to detect the location of the input document's edges. This detection of the location of the input document's edges enables the digital scanner to provide electronic registration and electronic skew correction. Moreover, the detection of the location of the input document's edges enables the digital scanner to provide automatic magnification selection. However, this edge detection depends upon the ability of the digital scanner to sense the difference in the diffuse reflectance between the input document's background and the surrounding platen cover surface. Thus, a platen cover with a black surface (or specularly reflecting surface which appears black to the optical system) is preferred to allow the unambiguous detection of the extremes of a document with a lighter background.

While this low diffuse reflectance platen cover permits reliable detection of the input document's edges, the low diffuse reflectance platen cover fails to suppress the printing of black borders or punch holes. Moreover, the low diffuse reflectance platen cover provides very low contrast images when transparencies are used as the input document.

In view of the adverse productivity impact that a high diffuse reflectance platen cover has, when utilized with a digital scanner and the problems associated with utilizing a low diffuse reflectance platen cover when trying to suppress undesirable dark areas, the present invention proposes a platen cover for a digital scanner which utilizes at least two different reflectance modes. In other words, the present invention proposes a platen cover which provides a low diffuse reflectance surface when the digital copier or digital scanner is trying to detect the location of the input document's edges and provides a high diffuse reflectance surface when the digital scanner is actually scanning the input document so as to convert the image into an electronic file.

OBJECTS AND SUMMARY OF THE PRESENT INVENTION

One aspect of the present invention is a platen cover for covering a glass platen of a scanner. The platen cover includes a platen cover backing member and a light control structure located on a surface of the platen cover backing member which is adjacent to the glass platen. The light control structure is switchable between a transparent state and an opaque state.

Another aspect of the present invention is a digital scanning system. The system includes a transparent platen; illumination means for illuminating a document positioned on the transparent platen; and reflectance means for providing a high reflectance background around the document in one mode and for providing a low reflectance background around the document in another mode.

A third aspect of the present invention is a method for digitally scanning a document. The method provides a low reflectance background around the document; scans the low reflectance background and document; determines an edge of the document; provides a high reflectance background around the document; scans the high reflectance background and the document; and produces digital image data relating to an image on the document.

Further objects and advantages of the present invention will become apparent from the following description of the various features of the present invention.

BRIEF DESCRIPTION OF THE DRAWINGS

The following is a brief description of each drawing used in describing the present invention, and thus, are being presented for illustrative purposes only and should not be limitative of the scope of the present invention, wherein.

DETAILED DESCRIPTION OF THE PRESENT INVENTION

Figure 1:
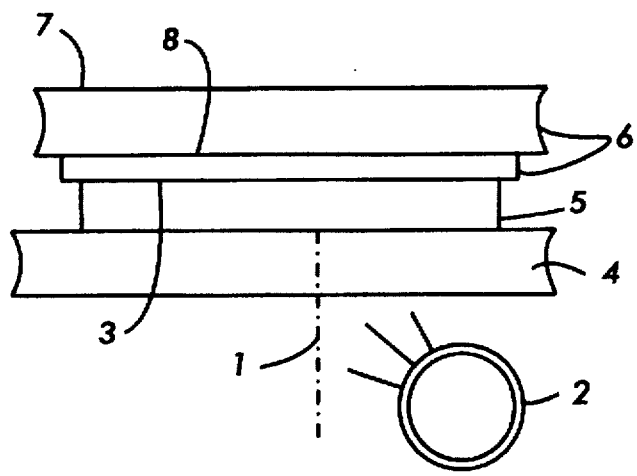
FIG. 1 is a block diagram illustrating one embodiment of the present invention.

For a general understanding of the present invention, reference is made to the drawings. In the drawings and in the specification, like reference numerals have been used throughout to designate identical or equivalent elements or steps.

FIG. 1 illustrates an illumination system for a digital scanner according to one embodiment of the present invention. In this embodiment, a light source 2 is used to illuminate an input document 5 through a glass platen 4. When the digital scanner is in an operational mode, a platen cover assembly 6 is usually laid over the image document as the input document 5 lies upon the glass platen 4.

The platen cover assembly 6 includes a platen cover backing 7 which has a black or specularly reflecting surface 8 formed on the side of the platen cover backing 7 which is closest to the light source 2. The platen cover assembly 6 further includes a liquid crystal control structure 3 which is placed over the black or specularly reflecting surface such that the liquid crystal control structure 3 is positioned between the black surface 8 and the input document 5.

When the input document 5 is lying upon the glass platen 4, the liquid crystal control structure 3 electrically switches between an ON and OFF state so as to provide a low diffuse reflectance mode and a high diffuse reflectance mode.

In a preferred embodiment of the present invention, the digital scanner, through a controller, will cause a voltage to be applied to the liquid crystal control structure, thereby providing a dark background surrounding the document. Thereafter, the digital scanner will perform a pre-scan of the document to detect the document's edges. This detection is carried out by conventional software routines or hardware circuits. After the document's edges are detected, the digital scanner, through the controller, turns OFF the voltage to the liquid crystal control structure so as to provide a white background similar to the document's background. The document is then scanned (full scan) so that a full digitization of the image can be realized. The exact operation of this liquid crystal control structure 3 will be discussed below with respect to FIGS. 3 and 4.

Figure 2:
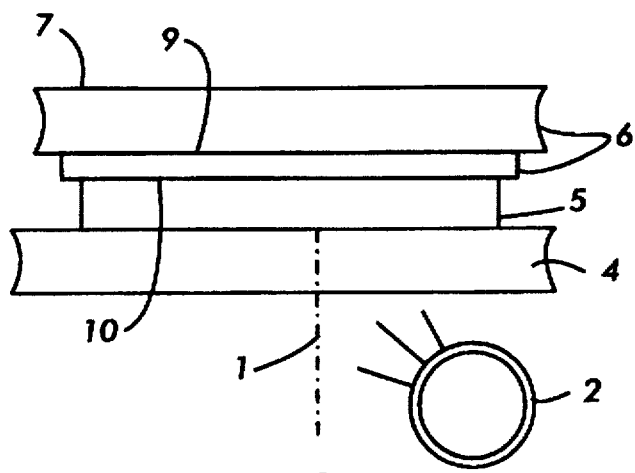
FIG. 2 is a block diagram illustrating another embodiment of the present invention.

FIG. 2 illustrates an illumination system for a digital scanner according to another embodiment of the present invention. In this embodiment, a light source 2 is used to illuminate an input document 5 through a glass platen 4. When the digital scanner is in an operational mode, a platen cover assembly 6 is usually laid over the image document as the input document 5 lies upon the glass platen 4.

The platen cover assembly 6 includes a platen cover backing 7 which has a diffuse white surface 9 formed on the side of the platen cover backing 7 which is closest to the light source 2. The platen cover assembly 6 further includes an electrochromic control structure 10 which is placed over the diffuse white surface 9 such that the electrochromic control structure 10 is positioned between the diffuse white surface 9 and the input document 5.

When the input document 5 is lying upon the glass platen 4, the electrochromic control structure 10 electrically switches between an ON and OFF state so as to provide a low diffuse reflectance mode and a high diffuse reflectance mode.

In a preferred embodiment of the present invention, the digital scanner, through a controller, will cause a voltage to be applied to the electrochromic control structure 10 causing the electrochromic material to become dark and absorbing, thereby providing a dark background surrounding the document. Thereafter, the digital scanner will perform a pre-scan of the document to detect the document's edges. This detection is carried out by conventional software routines or hardware circuits. After the document's edges are detected, the digital scanner, through the controller, turns OFF the voltage to the electrochromic control structure 10, causing the electrochromic material to become nearly transparent so as to provide a white background similar to the document's background. The document is then scanned (full scan) so that a full digitization of the image can be realized. The exact operation of this electrochromic control structure 10 will be discussed below with respect to FIGS. 3 and 4.

Figure 3:
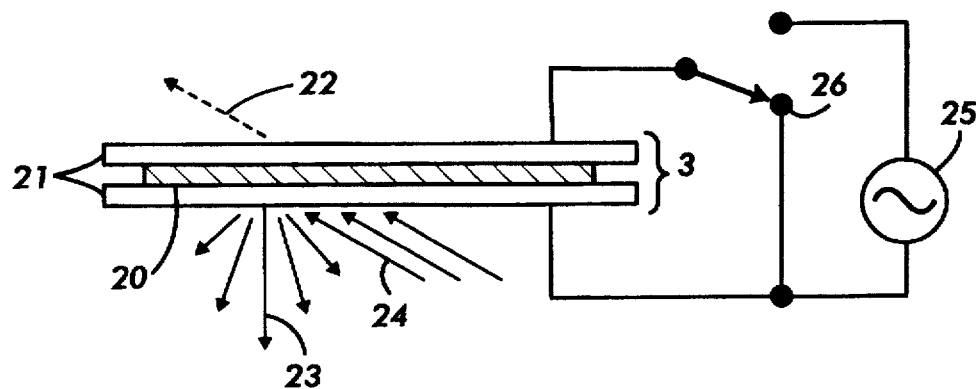
FIG. 3 is a block diagram illustrating the light control structure of the platen cover in the OFF state according to the present invention.

FIG. 3 illustrates the functionality of the liquid crystal control structure 3 when the liquid crystal control structure 3 is in an OFF state. As discussed above, the liquid crystal control structure 3 electrically switches between an ON state and an OFF state so as to provide a low diffuse reflectance mode and a high diffuse reflectance mode, respectively. As illustrated in FIG. 3, the liquid crystal control structure 3 is made up of two transparent electrode sheets 21 which sandwich a liquid crystal material 20. The transparent electrode sheets 21 are electrically connected to an AC power source 25 and a switch 26.

Switch 26 is controlled by a controller (not shown) which controls the position of the switch 26 depending on the mode of the scanner. If the scanner requires a pre-scanning mode which mode may be selected by a user through a user interface, the switch 26 will turn OFF and ON in response to the controller. On the other hand, if the scanner does not require a pre-scanning mode which mode may be selected by a user through a user interface, the switch 26 will turn only OFF in response to the controller.

When the liquid crystal control structure 3 is in an OFF state; i.e., the switch 26 is positioned such that no electric power is transmitted to the transparent electrode sheets 21; the light 24 coming from the light source 2 is reflected back (23) towards the lens and photosensors (not shown) of the digital scanner, thereby creating a highly reflective white surface phenomenon. It is noted that only a small amount (22) of the incident light 24 is transmitted through the liquid crystal control structure.

Figure 4:
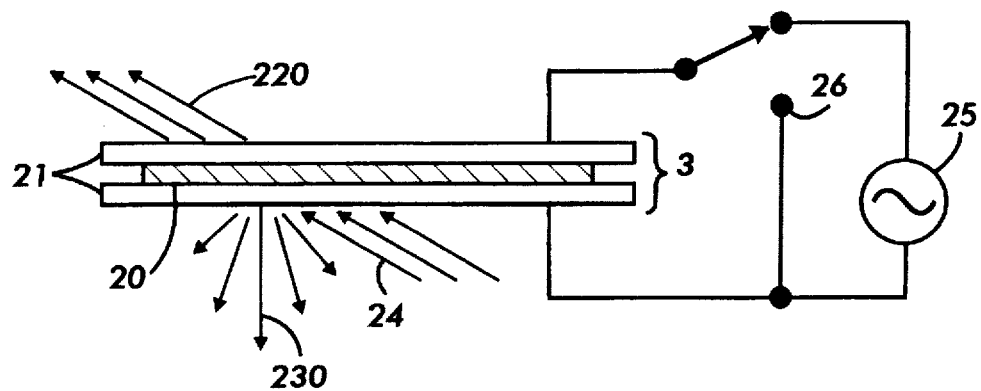
FIG. 4 is a block diagram illustrating the light control structure of the platen cover in the ON state according to the present invention.
Figure 6:
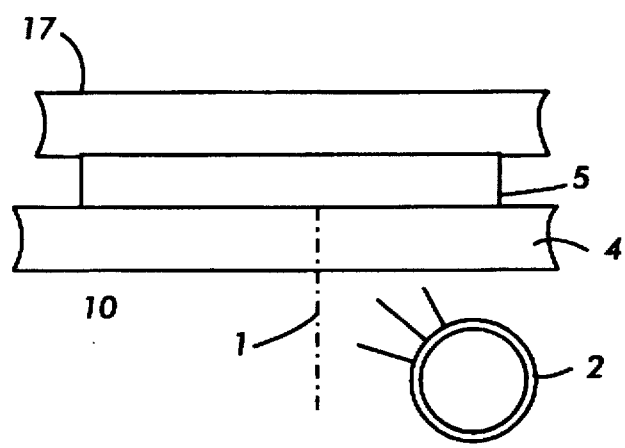
FIG. 6 is a block diagram illustrating an architecture for a conventional scanner.

FIG. 4 illustrates the functionality of the liquid crystal control structure 3 when the liquid crystal control structure 3 is in an ON state. When the liquid crystal control structure 3 is in an ON state; i.e., the switch 26 is positioned such that electric power is transmitted to the transparent electrode sheets 21; the light 24 coming from the light source 2 is transmitted forward (220) towards the black or specularly reflecting surface 8 of the platen cover backing 7, thereby creating a black or specularly reflecting surface phenomenon. It is noted that only a small amount (230) of the incident light 24 is reflected from the liquid crystal control structure towards the lens and photosensors (not shown) of the digital scanner, causing a dark background to appear when viewed along the optical centerline 1.

Both high and low diffuse reflectance platen cover surfaces have unique advantages, depending upon the current function of the digital scanner. The present invention provides a platen cover surface which may be quickly switched from low to high diffuse reflectance to simultaneously capture the advantages of both approaches with one simple structure and thereby eliminate the failure modes associated with the presence of the incorrect platen reflectance.

As illustrated in FIG. 1, the surface of the platen cover facing the input document is first covered with either a specular reflecting material or a black material. The specular reflectance material may be, for example, a thin brush aluminum sheet or a thin polymer sheet coated with a highly reflecting material such as aluminum or silver. The diffuse black material may be a black pigment or dye introduced into the platen backing or coated onto the platen backing. Directly attached to this surface of low diffuse reflectance is a liquid crystal control structure. This structure may be electrically switched from an OFF state in which the incident light 24 is diffusely scattered (23) to an ON state in which the structure is reasonably transparent to the incident light 24. As noted above, the liquid crystal control structure is switched ON by the application of an alternating voltage. When the OFF state is present, the liquid crystal control structure 3 causes a platen cover surface 8 covering the input document 5 to appear as a diffuse white material because of the large amount of light diffusely reflected from it. Switching the control structure 3 to its ON state by application of a voltage across the liquid crystal material, the control structure 3 becomes nearly transparent. Thus, the transmitted light is either specularly reflected (at an angle) equal to the incident angle (or absorbed by a black surface material located above the liquid crystal control structure 3). In either case, the amount of light traveling back along the lens axis 1 from points on the platen cover is significantly reduced and the platen cover surface appears black to the lens or photosensors collecting the reflected light.

As an alternative to coating the surface of the platen cover with a specular reflecting material or black material, the liquid crystal control structure itself could have an upper electrode surface constructed of a highly reflective metallic coating such as aluminum or silver. The forming of the liquid crystal control structure with an upper electrode of a highly reflective metallic coating eliminates the need for a separate reflecting surface between the platen cover backing and the liquid crystal control structure.

Although FIGS. 3 and 4 have been described with respect to a liquid crystal control structure, an electrochromic structure will work in a similar manner. When utilizing electrochromic material to provide the reflectance switching platen surface, the platen cover backing material has a diffuse white surface or coating applied to its underside. As with the liquid crystal control structure, the electrochromic control structure is directly attached to the diffuse white surface or coating wherein the electrochromic control structure consists of an electrochromic material sandwiched between two electrodes. Application of a voltage to these electrodes causes the control structure to switch from a nearly transparent state to a dark absorbing state. Thus, in the transparent state, the platen cover assembly has the effective reflectance property of diffuse white with respect to the optical system, and in the absorbing state, the assembly has the effective reflectance property of diffuse black with respect to the optical system.

In the preferred embodiment of the present invention, the liquid crystal control structure is a liquid crystal structure which is now available from Glaverbel, S.A. of Belgium. The liquid crystal structure was formerly produced under the tradename "Taliq". With respect to the electrochromic control structure, the preferred embodiment would utilize an electrochromic structure similar to one produced by OCLI of Santa Rosa, Calif.

Figure 5:
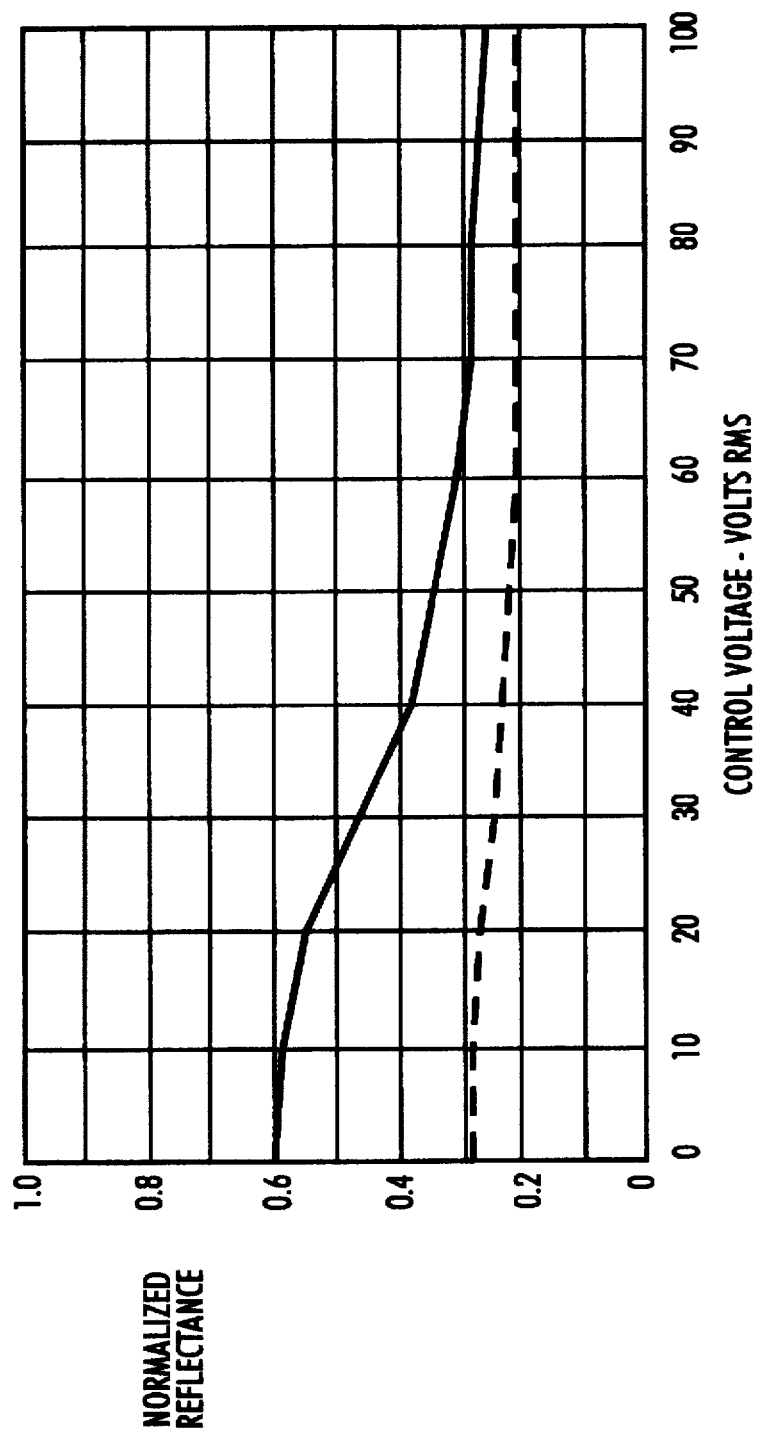
FIG. 5 is a graph illustrating an example of the reflectance properties of a platen cover utilizing the present invention.

FIG. 5 is a graph illustrating the normalized reflectance values relative to a paper background as a voltage is increased stepwise. More specifically, the values illustrated by the solid line in FIG. 5 result from utilizing a liquid crystal control structure on the platen cover assembly wherein the platen cover backing has a specular reflectance coating applied thereto. In this example, a "Taliq" type liquid crystal control layer was placed between specular reflectance coating and a 4 mm thick glass platen.

The dotted line represents the resulting reflective values relative to a white paper background when utilizing a diffuse black surface on the platen cover backing and a liquid crystal control structure. In other words, the structure was the same as that noted above with respect to the spectral reflective coating except the specular reflective coating was replaced by a black surface.

As shown in FIG. 5, with respect to the specular reflectance backing case, the effective platen reflectance could be switched from 60 percent (OFF state) to 27 percent (ON state). Moreover, FIG. 5 shows that the effective platen reflectance with respect to the black backing case switched from 28 percent (OFF state) to 21 percent (ON state). These reflectance values demonstrate the performance of a particular set of materials, and do not illustrate the limits of reflectance that can be achieved with improved material selection.

The present invention provides the ability to quickly switch the platen cover from high to low reflectance which offers several advantages. As described above, document edge detection can be performed while the cover is in the low reflectance state, and image scanning can performed after switching to the high reflectance state, thereby achieving the advantages of both states.

Although the present invention has been described using a scan, retrace, scan and retrace to produce edge detection and image data, the present invention can be carried with a scan and retrace operation. More specifically, the scanner may be operated such that the retrace operation is used to detect the document's edges and possibly histogram data with the platen cover switched to the low reflectance state, then quickly switching to the high reflectance state to perform the image scanning.

Although the present invention has been described with respect to a white background document, any background document can be used. Moreover, the present invention can operate with a transparency or a thin document. For example, a user can select a transparency or thin document scan mode which enables a temporary elimination of the switching to the low reflectance state (the document edge detection state) and maintains the high reflectance state for scanning the input with a transparent or thin document background.

Lastly, a mode to eliminate copying of dark features on the backside of thin input documents can be enabled by maintaining the platen cover in the low reflectance state for both edge detection and image capture.

While the present invention has been described with reference to various embodiments as disclosed above, it is not confined to the details set forth above, but is intended to cover such modifications or changes as may come within the scope of the attached claims.

What is claimed is:

1. A platen cover for covering a glass platen of a scanner, comprising:

a platen cover backing member;

a liquid crystal light control mechanism located on a surface of said platen cover backing member which is adjacent to the glass platen;

said liquid crystal light control mechanism being switchable between a transparent state and an opaque state; and a specularly reflecting material located between said platen cover backing member and said liquid crystal light control mechanism.

2. The platen cover as claimed in claim 1, wherein said liquid crystal light control mechanism comprises:

a first electrode;

a second electrode; and a liquid crystal material sandwiched between said first and second electrodes;

said first electrode, located adjacent said platen cover backing member, being formed of a highly reflective material;

said second electrode, located adjacent the glass platen, being formed of a transparent material.

3. A platen cover for covering a glass platen of a scanner, comprising:

a platen cover backing member: and a electrochromic light control mechanism located on a surface of said platen cover backing member which is adjacent to the glass platen;

said electrochromic light control mechanism being switchable between a transparent state and an opaque state; and a diffuse white material located between said platen cover backing member and said electrochromic light control mechanism.

4. A digital scanning system comprising:

a transparent platen;

illumination means for illuminating a document positioned on said transparent platen;

reflectance means for providing a high reflectance background around the document in one mode and for providing a low reflectance background around the document in another mode;

means for converting light reflected from said reflectance means and the document into digital image data; and means for detecting an edge of the document from the digital image data.

5. The digital scanning system as claimed in claim 4, further comprising:

means for printing the digital image data onto a recording medium.

6. The digital scanning system as claimed in claim 4, wherein said reflectance means comprises:

a platen cover backing member; and a light control structure located on a surface of said platen cover backing member which is adjacent to the glass platen;

said light control structure being switchable between a transparent state and an opaque state.

7. The digital scanning system as claimed in claim 6, wherein said light control structure is a liquid crystal light control mechanism.

8. The digital scanning system as claimed in claim 6, wherein said light control structure is an electrochromic light control mechanism.

9. The digital scanning system as claimed in claim 7, further comprising:

a diffuse black material located between said platen cover backing member and said light control structure.

10. The digital scanning system as claimed in claim 7, further comprising:

a specularly reflecting material located between said platen cover backing member and said light control structure.

11. The digital scanning system as claimed in claim 8, further comprising:

a diffuse white material located between said platen cover backing member and said light control structure.

12. The digital scanning system as claimed in claim 7, wherein said liquid crystal light control mechanism comprises:

a first electrode;

a second electrode; and a liquid crystal material sandwiched between said first and second electrodes;

said first electrode, located adjacent said platen cover backing member, being formed of a highly reflective material;

said second electrode, located adjacent the glass platen, being formed of a transparent material.

13. A method for digitally scanning a document, comprising the steps of:

(a) providing a low reflectance background around the document;

(b) scanning the low reflectance background and document;

(c) determining an edge of the document;

(d) providing a high reflectance background around the document;

(e) scanning the high reflectance background and the document; and (f) producing digital image data relating to an image on the document.

14. The method as claimed in claim 13, further comprising the steps of:

(g) determining if a transparency mode command has been entered by a user;

(h) causing said steps (a), (b), and (c) to be bypassed when said transparency mode command has been entered.

15. The method as claimed in claim 13, further comprising the steps of:

(g) determining if a thin document mode command has been entered by a user;

(h) causing steps (d), (e), and (f) to be bypassed when said thin document mode command has been entered, using the scanned image data from step (b) as the desired image data for final reproduction.

* * * * *